(12) United States Patent
Khanin et al.

(10) Patent No.: US 8,105,024 B2
(45) Date of Patent: Jan. 31, 2012

(54) SEAL IN GAS TURBINE

(75) Inventors: Alexander Khanin, Moscow (RU);
Arkadi Fokine, Moscow (RU); Maxim Konter, Klingnau (CH); Sergey Vorontsov, Moscow (RU)

(73) Assignee: Alstom Technology Ltd, Baden (CH)

( * ) Notice: Subject to any disclaimer, the term of this patent is extended or adjusted under 35 U.S.C. 154(b) by 796 days.

(21) Appl. No.: 12/236,995

(22) Filed: Sep. 24, 2008

(65) Prior Publication Data
US 2009/0081027 A1    Mar. 26, 2009

(30) Foreign Application Priority Data
Sep. 24, 2007   (EP) ...................................... 07117011

(51) Int. Cl.
*F02C 7/28* (2006.01)
(52) U.S. Cl. ................. 415/170.1; 415/171.1; 415/173.1
(58) Field of Classification Search ............... 415/170.1, 415/173.1–173.7, 174.1, 174.2, 174.3, 171.1, 415/172.1
See application file for complete search history.

(56) References Cited

U.S. PATENT DOCUMENTS

| 3,754,766 A | 8/1973 | Asplund |
| 5,709,530 A | 1/1998 | Cahill et al. |
| 2008/0155987 A1* | 7/2008 | Amond et al. ................ 60/737 |

FOREIGN PATENT DOCUMENTS

| FR | 2 188 054 A | 1/1974 |
| GB | 1 358 798 A | 5/1972 |

OTHER PUBLICATIONS

European Search Report.

* cited by examiner

*Primary Examiner* — H. Jey Tsai
(74) *Attorney, Agent, or Firm* — Buchanan Ingersoll & Rooney PC

(57) ABSTRACT

A seal assembly for a gas turbine is arranged in grooves of a rotor heat shield having several bends. The assembly comprises four seal portions overlapping one another and extending in the axial, radial, and circumferential direction with respect to the turbine rotor. A holding means retains the radial sections of one seal portion allowing a limited movement of said seal portion independent of another seal portion. The independent movement assures contact of the individual seal portions with all mating surfaces of the rotor heat shield and improved sealing function regardless of displacements of the rotor heat shield and tolerances of turbine parts.

6 Claims, 6 Drawing Sheets

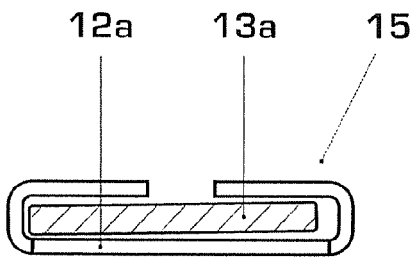
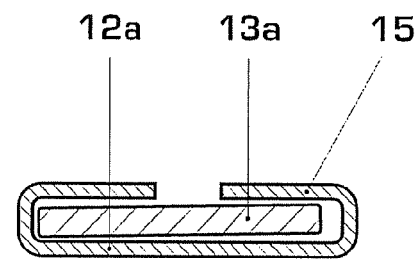
FIG. 4a  FIG. 4b
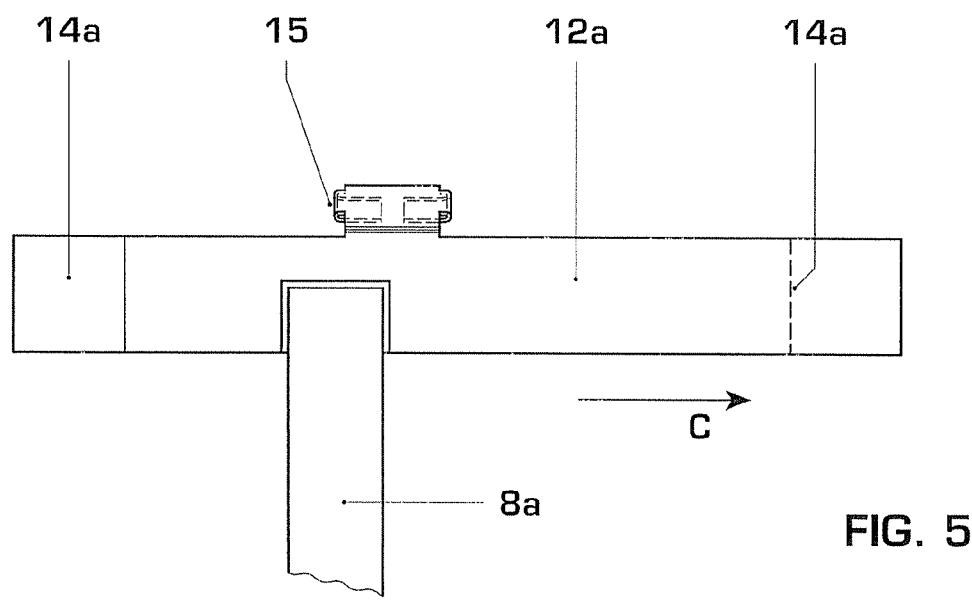
FIG. 5

SEAL IN GAS TURBINE

RELATED APPLICATION

This application claims priority under 35 U.S.C. §119 to European Patent Application No. 07117011.2 filed in Europe on Sep. 24, 2007, the entire content of which is hereby incorporated by reference in its entirety.

TECHNICAL FIELD

The present disclosure relates to a seal in a gas turbine, in particular a seal placed between a rotor heat shield and a rotating blade and between adjacent rotor heat shields.

BACKGROUND INFORMATION

Rotor heat shields serve to provide a platform in the gas flow path and on the radially inner side of a vane. Typically they form together with a honeycomb seal a labyrinth seal on its radially inner side. The rotor heat shield combined with the honeycomb seal reduces flow losses between stator and rotor and thus improves gas turbine efficiency.

In the region of a gas entry and exit to and from a rotating blade, rotor heat shields typically have a complex shape including several bends. FIG. 1 shows a section of a gas turbine of the prior art including a rotor 1 having a rotor axis 1a, rotating blades 2 and a vane 3 mounted on the rotor. Bold arrows indicated a gas flow path, and a rotor heat shield 4 is arranged opposite the vane 3 in the gas flow path. The heat shield 4 is formed having bends, in particular in the regions A and B, which relate to the regions of gas entry and exit to and from a rotating blade, respectively. A cooling air supply cavity 5 is provided on the rotor side of the rotor heat shield 4, and cooling air is allowed to pass along the rotor side of the heat shield as indicated by the dashed arrows. The rotor heat shields 4 are arranged adjacent to one another in the circumferential direction of the rotor (in FIG. 1 out of the page) and are joined to the rotating blades 2 in the axial direction. A seal or seal assembly 6, 7 is arranged on the rotor heat shields 4. The seal assembly allows sealing of the space between adjacent rotor heat shields as well as sealing of the space between rotor heat shields and rotating blades. As such it serves to prevent cooling air from cooling spaces on the rotor side of the rotor heat shield from leaking into the gas flow path. Thus, the cooling air mass is maintained, and engine performance is assured.

Typically, the seal assembly comprises individual seal parts 6 and 7, each placed in a groove of the rotor heat shield and having several bends according to the bends of the rotor shield 4 and the groove therein. The individual seal parts 6 and 7 are configured to overlap one another at their end portions allowing for air tightness. They further overlap with end portions of seals 8a and 8b arranged at the rotating blades 2. Both seal parts 6 and 7 and their respective groove extend in the turbine axial direction, along a first bend to the turbine radial direction, along a second bend and again in the turbine axial direction. There, at the location where the rotor heat shield meets the rotating blade, the seal parts 6 and 7 each have an additional section extending in the turbine circumferential direction (extending out of the page of the figure) sealing the space between heat shield and blade.

The air tightness of the seal assembly however, can be compromised because the sealing surfaces cannot simultaneously match all the bent surfaces of the rotor heat shield 4 within given tolerances.

In addition, the cast parts can deviate in their dimensions and/or can get displaced relative to parts of adjacent rotor heat shields during turbine operation. This can aggravate the air tightness of the air cavity and result in a risk of increased loss of cooling air and thus reduction of the turbine performance. Problems can further arise during the mounting process. Frequently, the seal must be deformed in order to enable mounting on the rotor. This deformation can lead to radial gaps in critical areas resulting in additional air leaks.

SUMMARY

A seal for gas turbines is disclosed suitable for arrangement on rotor heat shields of the type described in the state of the art. The seal shall in particular overcome the disadvantages described in connection with the state of the art and reduce cooling air leaks from a cooling air passage on the rotor side of the heat shield into the gas flow path between adjacent rotor heat shields and between a rotor heat shield and an adjacent rotating blade. In addition, the seal design shall allow mounting of the seal in any combination of tolerances of position of rotor heat shield and rotating blade.

A seal assembly arranged on a rotor heat shield of a turbine, the rotor heat shield being placed on the rotor of a gas turbine adjacent to further rotor heat shields in the circumferential direction of the rotor, and the rotor heat shield comprising bends from the turbine radial to the turbine axial direction, the rotor heat shield furthermore comprising grooves for placement of the seal assembly therein, where the seal assembly comprises a first and second seal, each comprising an axially extending portion and radially extending portions and bends extending along the bends of the rotor heat shield and placed in grooves of the rotor heat shield, and each comprising a circumferentially extending portion placed in a circumferentially extending groove at each end face of the rotor heat shield facing an adjacent rotating blade on the rotor wherein the first and second seal in the seal assembly each comprise first to fourth seal portions, where for each seal a first seal portion extends in the axial direction and along a first bend to the radial direction, and a second seal portion extends along the radial direction, along a second bend to the axial direction, and following the second bend the second seal portion furthermore extends in the circumferential direction, and a third seal portion extends along the axial direction and along the first bend to the radial direction and at least partially overlaps the first seal portion in the axial direction, and a fourth seal portion extends in the circumferential direction, and at least partially overlaps the second seal portion, and where the second and fourth seal portion is separate from the third seal portion, and the seal assembly comprises retaining means enveloping the radially extending section of the third seal portion and retaining the third seal portion in the axial direction and allowing a limited turning movement of the third seal portion away from the radial direction.

In another aspect, a seal assembly for a gas turbine is disclosed which is arranged in grooves of a rotor heat shield having several bends. Such an assembly comprises a plurality of seal portions overlapping one another and extending in at least one of axial, radial, and circumferential directions with respect to a turbine rotor; and holding means retaining radial sections of one seal portion to allow a limited movement of said seal portion independent of another seal portion to facilitate contact of the individual seal portions with mating surfaces of the rotor heat shield and provide a sealing function regardless of displacements of the rotor heat shield and tolerances of turbine parts.

BRIEF DESCRIPTION OF THE DRAWINGS

FIG. 4a and each show an embodiment of the retaining means along IVa-IVa and IVb-IVb respectively.

FIG. 5 shows a top view of one of the seals of the seal assembly along V-V and the interaction with a seal along the rotating blade.

DETAILED DESCRIPTION

Figure 1:
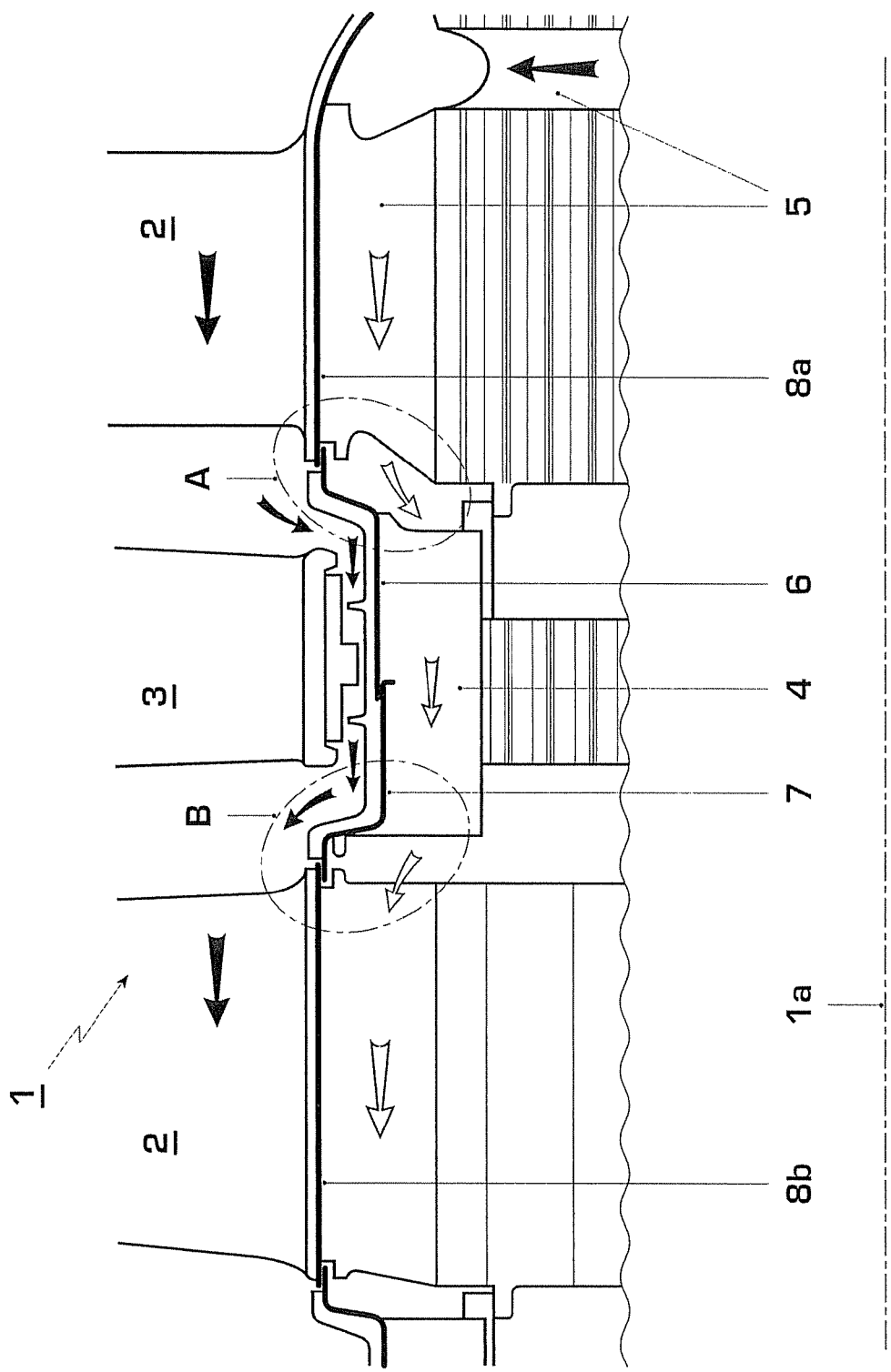
FIG. 1 shows a seal assembly according to prior art for arrangement on a rotor heat shield of a gas turbine.

A seal assembly is arranged on a turbine rotor heat shield, the rotor heat shield being placed opposite from gas turbine vanes and adjacent to further rotor heat shields in the peripheral (circumferential) direction of the rotor. The rotor heat shield comprises in particular several bends from the turbine radial to the turbine axial direction. The seal assembly comprises first and second seals, each having axially extending portions and a radially extending portion and bends connecting these axially and radially extending portions. They extend along the bends of the rotor heat shield. The rotor heat shield comprises grooves along the axial, radial, and circumferential direction as well as along the bends for placement of the seals therein. Each seal further comprises a circumferentially extending portion for placement in a circumferentially extending groove at each end face of the rotor heat shield facing an adjacent rotating blade.

The axial and radial directions each refer to directions relative to the turbine rotor. The radial direction of a groove and a seal portion placed therein shall be understood as either precisely in the radial direction or approximately in the radial direction according to the shape of the rotor heat shield.

According to the disclosure, each of the two seals in the seal assembly comprises four seal portions, all portions placed in grooves of the rotor heat shield. A first seal portion extends in the axial direction and along a first bend to the radial direction. A second seal portion extends along the radial direction and along a second bend to the axial direction. Following the second bend, the second seal portion furthermore extends in the circumferential direction. A third seal portion extends along the axial direction and along the first bend to the radial direction, overlapping at least a part of the first seal portion. A fourth seal portion extends in the circumferential direction overlapping at least to a part the second seal portion. In particular, the fourth and second seal portion is separate from the third seal portion. Additionally, the seal assembly comprises holding or retaining means, enveloping the radially extending part of the second seal portion and the radially extending portion of the third seal portion and retaining the third seal portion in the axial direction, yet allowing a limited turning movement of the radially extending section of the third seal portion away from the radial direction.

The retaining means allows a limited movement of the third seal portion alone and independent of the fourth or second seal portion, which are separate from the third seal portion. Such movement will occur in the case of a displacement of a rotor heat shield relative to an adjacent heat shield due to different thermal expansions of the turbine parts. The third seal portion may then turn away from the radial direction assuring sealing along the radial direction while the fourth seal portion and second seal portion remain in place and assure sealing in the circumferential direction. Due to the separation of the third from the fourth seal portion, independent movement is enabled, and a displacement of the fourth seal portion is prevented. Thus, its sealing function is maintained regardless of displacements of the rotor heat shields relative to each other or relative to an adjacent rotating blade.

Contact of all seal portions with mating surfaces of the rotor heat shield for a tight seal is assured by the independent movement of its seal portions and by the centrifugal force acting on them during operation of the gas turbine. Furthermore, the independent movement allows also for greater freedom of tolerances in any combination for mounting. Simultaneous adaptation of the individual seal portions to all surfaces of the rotor heat shields including all bends is assured due to centrifugal forces regardless of tolerances of rotor heat shield rotating blade parts, and related parts of the air cavities.

The seal assembly allows for air tight sealing between air cavities for cooling air on the rotor side of the heat shields and the hot gas space of the gas turbine. The seal assures in particular the sealing between adjacent rotor heat shields in the axial direction and between the rotor heat shields and adjacent rotating blades in the circumferential direction.

The retaining means and separate realization of the third and fourth seal portion are easily manufactured and mounted. The seal assembly is therefore a cost efficient solution to the sealing problem along bends.

The seal assembly is configured to join seals placed between rotating blades mounted on the rotor axially adjacent to the rotor heat shields assuring a continuous sealing function. For this, the adjacent seal portions are arranged overlapping each other.

For example, the first and third seal portions are joined, for example by welding, to form one integral part. Similarly, the second and fourth seal portions are joined to form one integral part as well.

In a first embodiment of the disclosure, the retaining means is an envelope or collar enveloping the radial section of the second seal portion and third seal portion, where the radial section of the second and third seal portion arranged such that they overlap each other in the region of the retaining means. The opening of the envelope is arranged such that it faces the axial direction of the turbine. The envelope is configured such that it allows a limited freedom of movement of the third portion within the envelope, the allowed movement being a turning movement of the radial section of the third portion away from the radial direction such that the radial section is at an angle to the radial direction. The C-shaped envelope is suitably dimensioned relative to the dimensions of the seal portions it encloses and the groove they are placed in such that the allowed movement results in an angle necessary in order to accommodate relative displacement of adjacent rotor heat shields such that the second and fourth seal portions remaining place in their circumferential grooves and sealing in that region is still assured.

In a first embodiment of the disclosure, the retaining means forms one integral part together with the second seal portion.

The collar has a C-shaped cross-section, where the second seal portion forms the center part (or back part) of the C-shape.

In a second embodiment of the disclosure, the retaining means is realized by a part separate from the second seal portion. For example, the holding means is realized by a retaining bar fixed on the rotor heat shield to either side of the seal portions such that they prevent any movement of the radial section of the third seal portion in the axial turbine direction and allowing however a limited turning movement.

FIG. 1 was elaborated on in connection with the state of the art.

Figure 2:
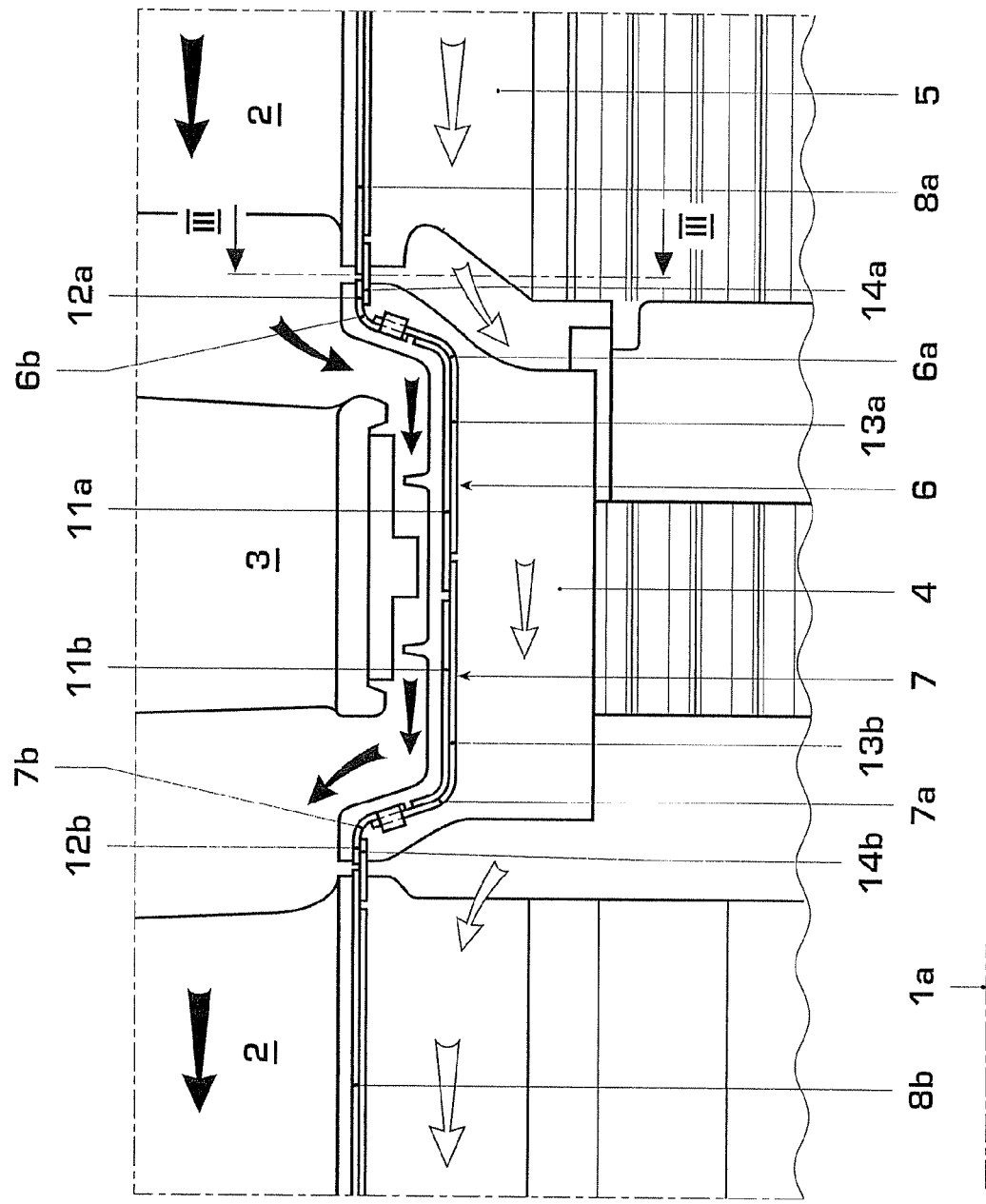
FIG. 2 shows a seal assembly according to the disclosure for arrangement on a rotor heat shield of a gas turbine, the rotor heat shield having several bends.
Figure 2A:
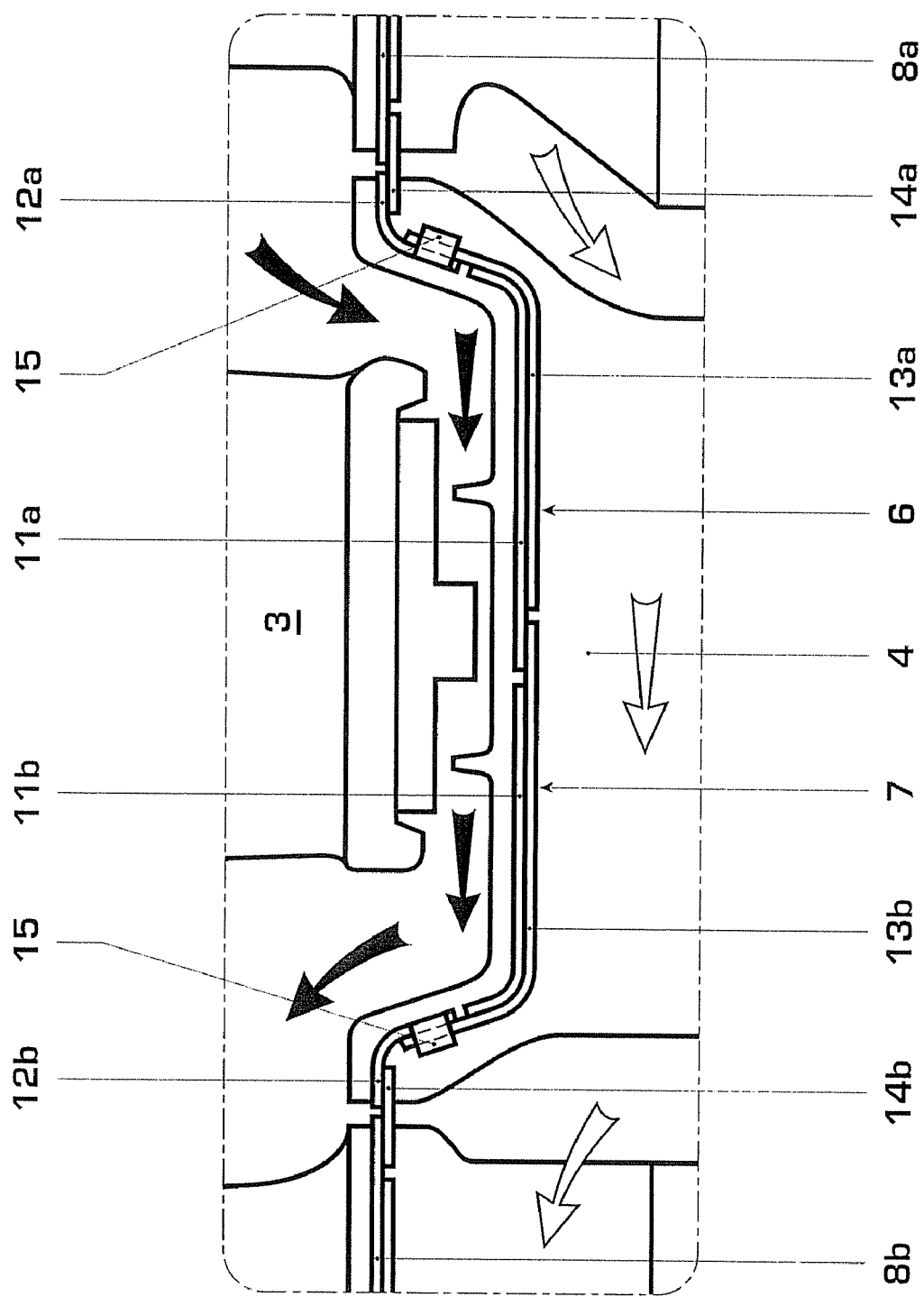
FIG. 2a shows in more detail the seal assembly with retaining means of FIG. 2.

FIGS. 2 and 2a show a section of a gas turbine similar to that of FIG. 1. It includes, as in FIG. 1, a rotor 1 of a gas turbine with rotor axis 1a, rotating blades 2, and vane 3. Opposite the vane 3, a rotor heat shield 4 is placed on the rotor, to which the seal assembly according to the disclosure may be applied. The rotor heat shield 4 has a contour following the turbine axial direction as well as approximately the turbine radial direction and furthermore comprises bends from the axial to the radial directions. The rotor heat shield furthermore comprises grooves extending along the contour, in particular along the bends.

The seal assembly according to the disclosure may equally be applied to rotor heat shields having a contour following the axial direction and the exact radial direction as well as bends.

Cooling air, as indicated by the open arrows, flows on the rotor side of the rotor heat shield. A hot gas leakage flow, as indicated by the bold arrows, flows between the vane tip and rotor heat shield. In order to prevent cooling air from reaching into the hot gas flow, in particular in the regions A and B, a seal assembly according to the disclosure is arranged in the grooves in the rotor heat shield 4. It is placed in grooves at the end face of the rotor heat shield 4, as shown in the figure, providing sealing between the rotor heat shield and a circumferentially arranged adjacent rotor heat shield (out of the page). The seal is further placed in grooves at the end faces of the rotor heat shield facing the rotating blades 2 providing sealing between the rotor heat shield and axially adjacent rotating blades 2. (Axial and circumferential directions again refer to directions with respect to the turbine rotor axis 1a).

The seal assembly comprises two seals 6 and 7, each extending from approximately the axial center of the rotor heat shield 4 in the axial direction, each extending along a bend 6a, 7a respectively, along the radial direction and along a second bend 6b, 7b respectively. They each finally extend along a short portion again in the axial direction towards the adjacent rotating blade. That same portion extends additionally in the circumferential direction along grooves facing the rotating blades 2.

Each seal 6 and 7 comprises four seal portions 11a-14a and 11b-14b, respectively, as shown in FIG. 2. The first portion 11a, 11b extends from approximately the center of the heat shield in the axial direction and around the bend 6a, 6b, and along the radial direction. The second portion 12a, 12b extends from the radial direction around the bend 7a, 7b and along the axial direction towards the rotating blades 2. It further extends in the circumferential direction (out of the page); this is further shown in FIG. 5. The third portion 13a, 13b extends from approximately the center of the heat shield in the axial direction and along the bend 6a, 6b, and along the radial direction, while overlapping the radial section of the second portion 12a, 12b. The fourth portion 14a, 14b extends in the circumferential direction while overlapping the circumferential section of the second portion 12a, 12b.

The features described in the following in connection with FIGS. 3-7 hold analogously for the seal portions of the second seal of the seal assembly.

Figure 3:
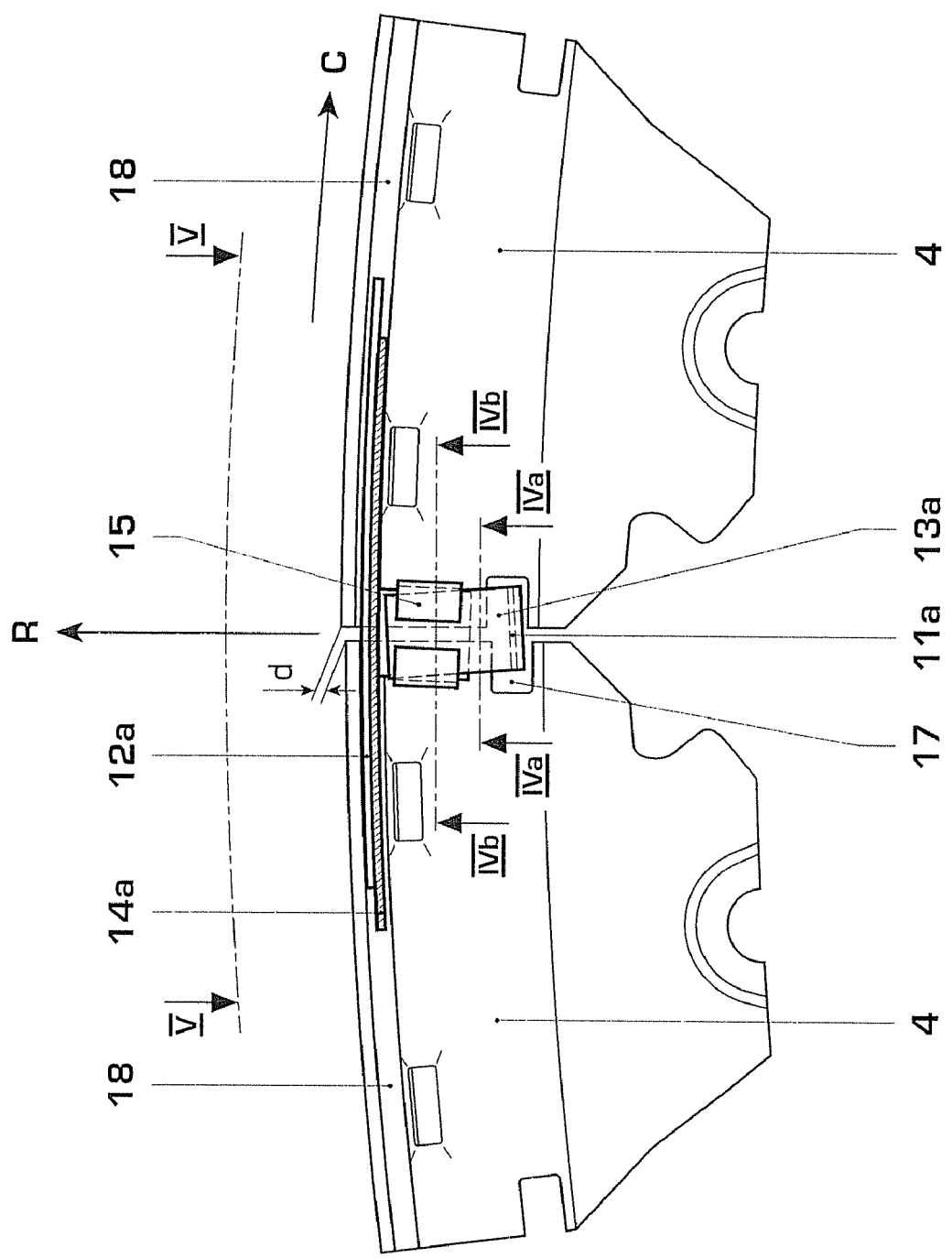
FIG. 3 shows a view of the seal assembly along to III-III and in particular the turned third portion within the limits of the holding means as a result of a relative radial displacement of the rotor heat shields.

FIG. 3 shows the functionality of the retaining means 15 placed around the radial section of the third seal portion 13a. The figure shows a view in the axial direction of the turbine, in particular of the end faces of two circumferentially adjacent rotor heat shields 4. They each comprise along their radially outer end, a groove 18 in the circumferential direction (C) provided for placement of the circumferential section of the second seal portion 12a and fourth seal portion 14a. A further groove 17 is provided for placement of the third seal portion 13a. The seal portion 13a extends along the axial direction and curves along the bend (6a in FIG. 2), and extends further in the radial direction (R) toward the fourth seal portion 14a. It overlaps in the radial section the second seal portion 12a. It is retained in its movement by a collar 15 enveloping both the radial section of the third seal portion 13a. The collar prevents the portion 13a from moving in the axial direction. However, it allows turning movement away from the radial direction (R), allowing a certain angle between the portion 13a and the radial direction (R). The turning of section 13a is due to a radial displacement (d) of the rotor heat shields with respect to one another. In particular, the movement of seal portion 13a independently of seal portions 12a and 14a assures that seal portions 12a and 14a remain in place in their circumferential groove 18. It assures reliable sealing in the case of a relative a radial displacement d of the adjacent rotor heat shields 4.

FIG. 4 shows a C-shaped cross-section of the collar as shown in FIG. 3. The envelope or collar 15, an integral part of portion 12a, envelops the radial section of seal portion 13a loosely so to allow limited movement.

FIG. 5 shows in a top view the interaction of the seal according to the disclosure with further seals 16 along the rotating blades 2. In order to assure a sealing function in the junction area of two adjacent seals 12a, 14a and 16, the seal portion 12a comprises a cutout in order to accommodate an overlap of an end portion of the rotating blade seal 16 shaped accordingly.

Figure 6:
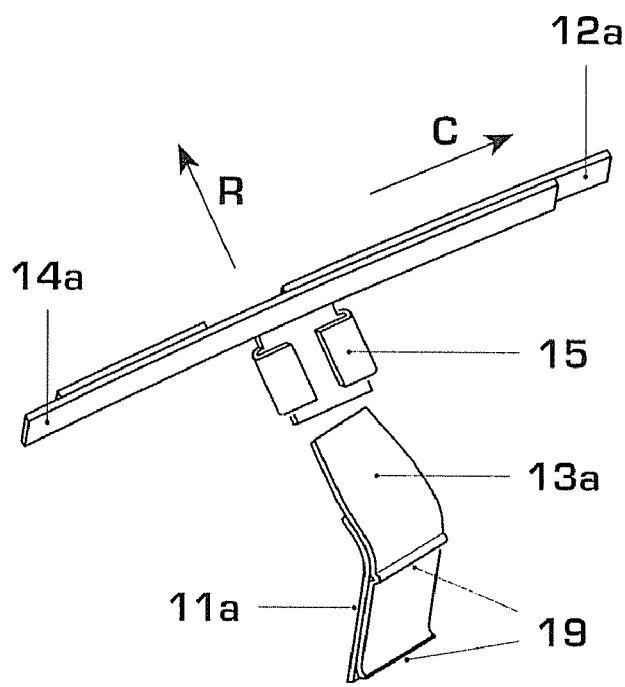
FIG. 6 shows a perspective view of one of the seals of the seal assembly prior to assembly.

FIG. 6 shows all four seal portions 11a-14a of one of the seals of the seal assembly. For example, the first and third seal portions 11a and 13a are joined together, for example by welding. Similarly, second and fourth seal portions 12a and 14a are joined together. Second seal portion 12a comprises a section extending in the circumferential direction (C), a bend extending from said section to the radial direction (R), a radially extending section, and the retaining means 15, all of which form one integral part. The retaining means 15 has a cross-sectional C-shape as shown in FIGS. 4a and b. The third seal portion and the retaining means 15 are dimensioned such that the third seal portions can be placed by sliding within the retaining means leaving a limited amount of turning movement about an axis perpendicular to the seal portion 13a and as illustrated in FIG. 3. The third seal portion 13a may comprise, as an optional feature, protrusions 19 over its width providing a better fit within the groove in the rotor heat shield.

Figure 7:
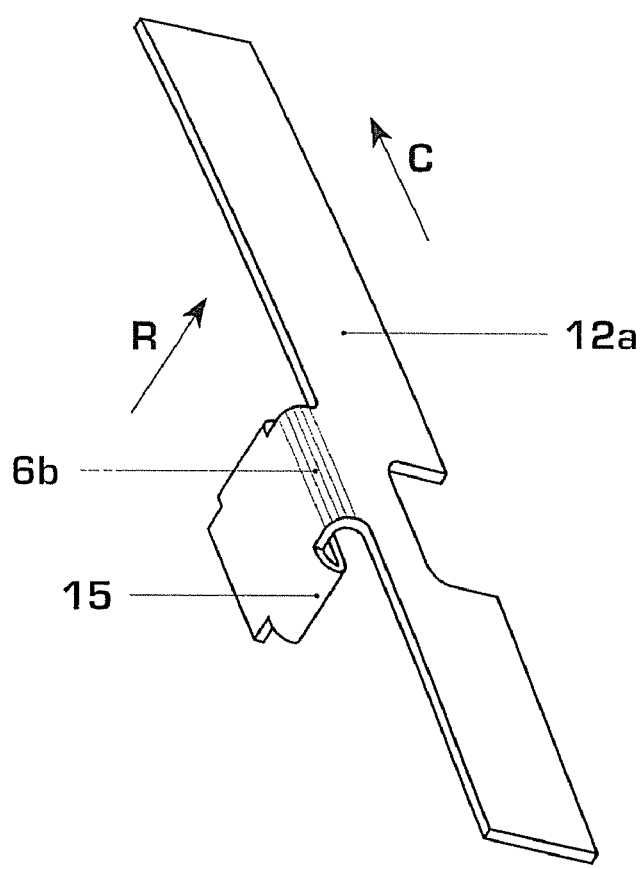
FIG. 7 shows a perspective view of the second seal portion and the retaining means forming one integral part.

FIG. 7 shows, for a better understanding of the seal's geometry, a further perspective view of the second seal portion 12a alone. It shows in particular the integral seal portion comprising the circumferential section having a cutout for placement of the end portion of the rotating blade seal 8a (see FIG. 5), the bend 6b to the radial section, the radial section, and the collar-shaped retaining means 15 extending away from the radial section.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

TERMS USED IN FIGURES 1 rotor
1*a* rotor axis
2 rotating blade
3 vane
4 rotor heat shield
5 cooling air cavity
6 first seal of seal assembly
7 second seal of seal assembly
6*a*, 6*b* first bend of the seal assembly
7*a*, 7*b* second bend of seal assembly
8*a*, *b* seal at adjacent rotating blade
9, 10 —
11*a*, 11*b* first portion of seal assembly
12*a*, 12*b* second portion of seal assembly
13*a*, 13*b* third portion of seal assembly
14*a*, 14*b* fourth portion of seal assembly
15 holding or retaining means
16 —
17 axial groove
18 circumferential groove
19 protrusion from third seal portion
C circumferential direction
R radial direction
A region of gas entry
B region of gas exit

What is claimed is:

1. A seal assembly arranged on a rotor heat shield of a turbine, the rotor heat shield being placed on the rotor of a gas turbine adjacent to further rotor heat shields in the circumferential direction of the rotor, and the rotor heat shield comprising bends from the turbine radial to the turbine axial direction, the rotor heat shield furthermore comprising grooves for placement of the seal assembly therein, where the seal assembly comprises a first and second seal, each comprising an axially extending portion and radially extending portions and bends extending along the bends of the rotor heat shield and placed in grooves of the rotor heat shield, and each comprising a circumferentially extending portion placed in a circumferentially extending groove at each end face of the rotor heat shield facing an adjacent rotating blade on the rotor wherein the first and second seal in the seal assembly each comprise first to fourth seal portions, where for each seal a first seal portion extends in the axial direction and along a first bend to the radial direction, and a second seal portion extends along the radial direction, along a second bend to the axial direction, and following the second bend the second seal portion furthermore extends in the circumferential direction, and a third seal portion extends along the axial direction and along the first bend to the radial direction and at least partially overlaps the first seal portion in the axial direction, and a fourth seal portion extends in the circumferential direction, and at least partially overlaps the second seal portion, and where the second and fourth seal portion is separate from the third seal portion, and the seal assembly comprises retaining means enveloping the radially extending section of the third seal portion and retaining the third seal portion in the axial direction and allowing a limited turning movement of the third seal portion away from the radial direction.

2. The seal assembly according to claim 1, wherein the retaining means is realized as a collar forming an integral part together with the radially extending section of the second seal portion.

3. The seal assembly according to claim 1, wherein the first and third seal portions are joined together.

4. The seal assembly according to claim 1, wherein the second and fourth seal portions are joined together.

5. A seal assembly for a gas turbine and arranged in grooves of a rotor heat shield having several bends, the assembly comprising:

a plurality of seal portions overlapping one another and extending in at least one of axial, radial, and circumferential directions with respect to a turbine rotor; and holding means retaining radial sections of one seal portion to allow a limited movement of said seal portion independent of another seal portion to facilitate contact of the individual seal portions with mating surfaces of the rotor heat shield and provide a sealing function regardless of displacements of the rotor heat shield and tolerances of turbine parts.

6. The seal assembly according to claim 5, wherein there are four seal portions in the plurality of seal portions.

* * * * *